April 15, 1958 B. HASBROUCK 2,831,180

TRAVELING MAGNETIC HALF-HEADS FOR MAGNETIC DRUMS

Filed June 1, 1955

INVENTOR
BEVIER HASBROUCK

BY J. L. Sterling
ATTORNEY

United States Patent Office 2,831,180
Patented Apr. 15, 1958

2,831,180
TRAVELING MAGNETIC HALF-HEADS FOR MAGNETIC DRUMS

Bevier Hasbrouck, Lima, Pa., assignor, by mesne assignments, to Sperry Rand Corporation, New York, N. Y., a corporation of Delaware Application June 1, 1955, Serial No. 512,535
8 Claims. (Cl. 340—174)

This invention relates to new and useful improvements in magnetic write-in read-out heads for magnetic memory drums, and has particular reference to an arrangement comprising a novel combination of a fixed head and a traveling head.

In the previous usual practice of writing in information on to a magnetic drum memory or reading out such information from such a drum, by the fixed head technique, it has been necessary to provide a complete fixed head i. e. core and winding for each channel on the drum, and, since the drum may have a large number of channels depending upon the required storage capacity thereof this has required a correspondingly large number of separate heads. This construction is naturally quite expensive especially when large storage capacity is required.

Certain problems in electronic computation require information to be read from or written on to the drum in monotonic sequence but at random times and for this type of application a traveling head technique might be employed.

A traveling head presents mechanical problems of construction which may involve uneconomical tolerances of parts. For instance, the head must move along the direction of the axis of the drum and must be positionable within say ±5 mils of its proper location, a requirement which may be practically met. It also should not deviate by more than 2 mils say in the direction around the drum, that is to say, the position should be reproducible within ±2 mils, a requirement which can also be practically met. Another requirement is that the head must never touch the rapidly rotating drum or it may be destroyed; while reading or writing the head should be about 1 mil away ±½ a mil. This latter requirement introduces a critical tolerance which may render the known traveling head techniques impractical for many applications.

An object of the invention is to provide a device which is more efficient and easier to operate than a regular complete traveling head and in which the critical tolerances between the moving parts are more easily obtained.

A further object is to provide a device in which the wear and liability of maladjustment are substantially reduced.

A still further object is to provide a device in which the cost of manufacture is substantially reduced over that of the usual fixed head reader.

Further and more specific objects, features and advantages will more clearly appear from the following description, especially when taken in connection with the accompanying drawings which form part of the specification.

In the present invention there is provided a number of fixed lower half heads equal in number to the number of channels on the drum and in permanent physical relation to the channels. Related to this fixed lower head portion is an upper traveling head portion comprising an upper core portion which, through suitable means, can be shifted to be alined with any one of the lower core portions to write-in and/or read-out information in any given channel. In this manner, since the traveling portion of the head is not required to move in critically close physical relation to the rotating drum but instead only in relation to the fixed lower head portion upon which it may ride without necessity for avoiding contact therewith, the arrangement will be seen to possess the advantages of the traveling head techniques without the disadvantages heretofore encountered.

The present preferred form which the invention may assume is shown in the drawings, of which, Fig. 1 shows a complete core and coil comprising a fixed magnetic head;

Figure 1:
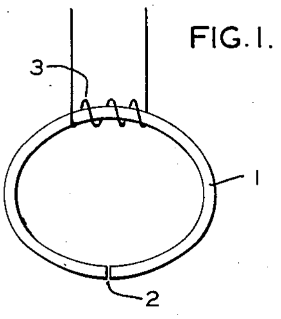

Referring now to the drawings, Fig. 1 shows a well known form of unitary magnetic head involving a magnetic core 1 of low reluctance, preferably of iron, with a narrow gap 2 in this core, and a coil 3. The narrow gap in the core will cause the magnetic flux to fan out into the surrounding space when writing information into the drum.

Figure 2:
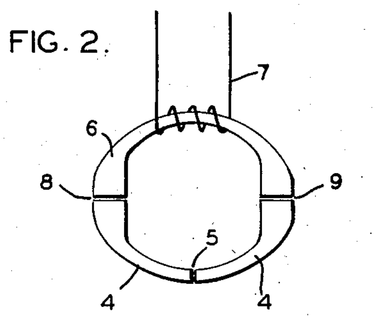
Fig. 2 shows my improved traveling and fixed core portions comprising in combination a magnetic head.

In Fig. 2 is a representation of a combined head in which the lower head portion 4 of the core includes the narrow gap 5 and related to this lower portion is the traveling complementary upper portion 6 around which is wrapped the coil 7. These core portions 4 and 6 are separated by narrow gaps such as 8 and 9. Specifically, additional gaps such as 8 and 9 in the magnetic circuit of the core have negligible effect on the read-write gap 5 if, as shown, the additional gaps 8 and 9 are small and/or the area of the faces of these additional gaps is large compared to the area of the gap face at 5.

Figures 3, 4, 5:
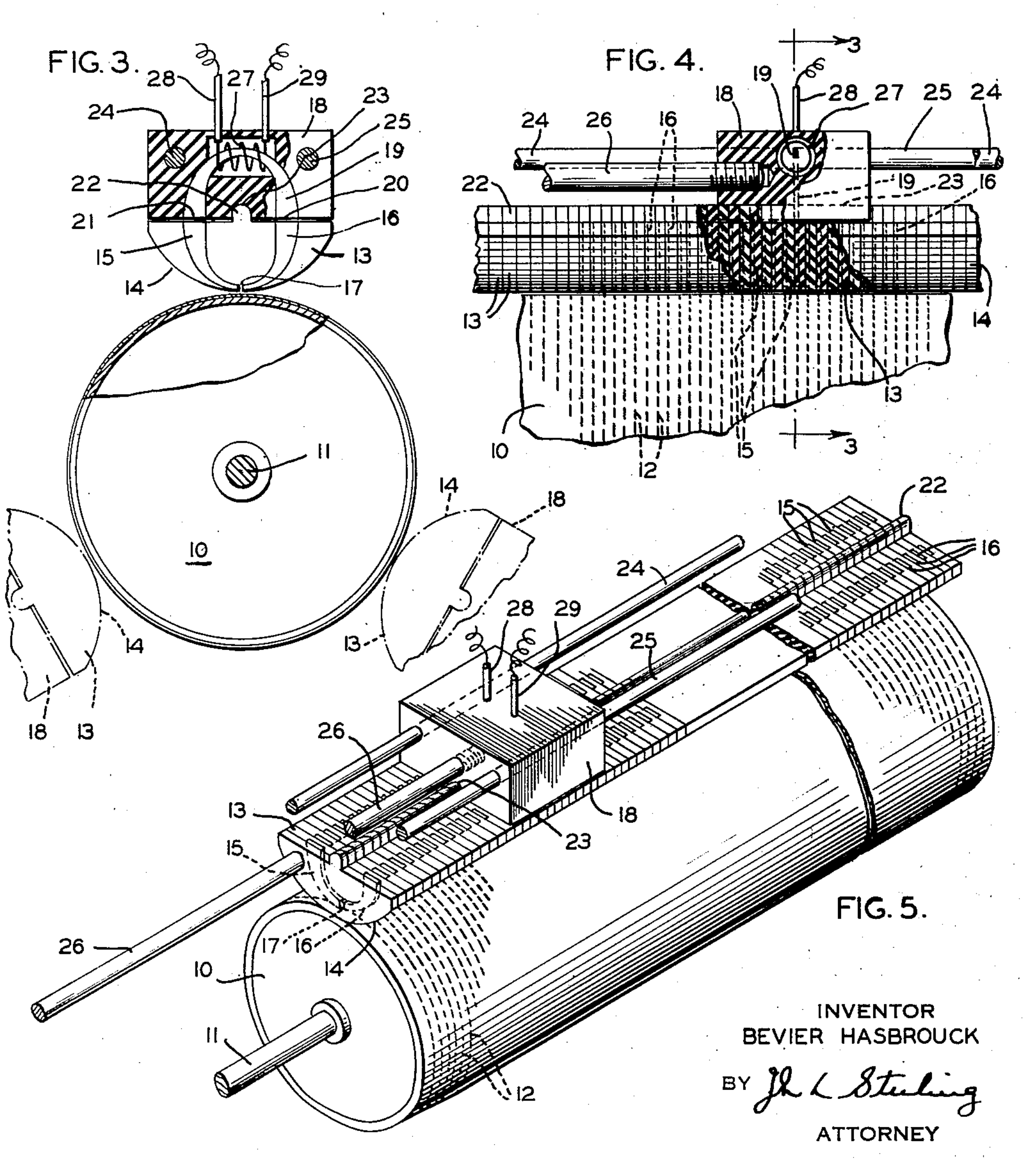
Fig. 3 is a traverse vertical section through a preferred form of my improved head and the related drum, taken on the line 3—3 of Fig. 4.
Fig. 4 is a partial longitudinal vertical section through the drum and improved head.
Fig. 5 is a somewhat schematic isometric view of the drum and head.

A preferred form which the invention may assume is shown more in detail in Figs. 3, 4, and 5 in which there is shown the rotating drum 10 mounted on shaft 11 which is suitably actuated. The drum 10 is provided with a multiplicity of parallel channels 12 for storing information.

Disposed above the drum is a read-write head portion comprising a fixed lower portion and a traveling upper portion. The lower fixed portion of the head is comprised of a series of plates 13 of insulation, one for each channel 12. The lower face of each of these plates is curved as shown at 14. Suitably embedded in the side of each plate is a pair of curved magnetic core strips or legs 15 and 16 of tapered form and with lower ends closely adjacent to form a read-write gap 17 level with the lowermost edge of the plate 13. The upper edges of these strips are flush with the flat upper edge of the plate 13. These strips of magnetic material are accurately alined with their respective channel to permit read-write operations.

The upper portion of the head is a traveling member formed of a molded block of insulation 18 in which is suitably embedded a U-shaped strip of magnetic material 19 with enlarged lower ends 20 and 21 disposed flush with the flat lower surface of the block 18 and immediately above the upper surfaces of the strips 15 and 16 respectively. The strip 19 and the strips 15 and 16 form complementary core portions. The gap between the strip 19 and the strips 15 and 16 may be of the order of 1 mil, and smaller than the gap 17. The upper surface of the plates 13 of the lower head portion is provided with an upstanding rib portion 22. This raised rib portion on each of the insulating plates 13 is alined with those on adjacent plates so as to form a continuous rib as shown in Fig. 5, and extending along parallel to the shaft 11 of the drum 10. The block 18 has a groove 23 therein cut into its lower face and extending parallel to the shaft 11 and cooperating with the continuous rib 22 to guide the traveling head in its movement back and forth. The small gap between the lower insulating blocks 13 and the lower surface of the insulating block 18 may be lubricated.

To further insure the accurate movement of the block 18 it may be provided with longitudinal apertures through which extend guide rods 24 and 25 which may suitably and fixedly be supported in any desired manner. Any suitable means may be used to reciprocate the block 18 such as a rod 26 which is threaded into one face of the block 18 and may be connected to any suitable mechanism for selectively moving the traveling head portion back and forth. The magnetic strip 19 is related to a winding 27 contained within the molded block 18 and wrapped around the strip 19 with lead out wires 28 and 29 connected thereto. The surfaces of the lower and upper head portion should be smooth and flat except for the rib 22 and should make good contact under light pressure. This contact distance may be as much as 1 mil. An occasional cleaning off of the products of wear may be necessary but the wear itself may be compensated for by a slight pressure on the traveling head.

In Fig. 3 there is shown in dot and dash lines the positions which may be assumed by other similar heads in instances where one head unit may be intended to serve channels 1, 4, 7, 10 etc.; another head serves channels 2, 5, 8, 11 etc.; and still another head serves channels 3, 6, 9, 12 etc.

There has been provided therefore a device which is efficient, more economical to manufacture, and in which the wear on the parts is substantially reduced.

While the invention has been described in detail and with respect to a present preferred form thereof, it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What I claim is:

1. In a magnetic memory device having a rotatable memory drum with a plurality of magnetic memory channels thereon, a lower fixed read-write head portion disposed in fixed position above the drum and comprising a plurality of magnetic core portions alined with the respective channels on the drum, an upper read-write head portion movable along and above the lower head portion and comprising a complementary magnetic core portion positionable in alinement with any one of the lower magnetic core portions, means for moving said upper head portion relative to said lower head portion, and a read-write coil on said upper core portion.

2. In a magnetic memory device, a read-write head comprising a lower fixed head portion comprising a plurality of magnetic core portions disposed in operative relation to a recording medium, an upper head portion movable with respect to the lower core portions and comprising a complementary core portion selectively positionable in alinement with any one of the lower core portions, and means for effecting said alignment of the respective upper and lower core portions.

3. In a magnetic memory device having a rotatable memory drum with a plurality of magnetic memory channels thereon, a lower fixed read-write head portion disposed in fixed position above the drum and comprising a plurality of magnetic core portions alined with the respective channels on the drum, an upper read-write head portion movable along and above the lower head portion and comprising a complementary magnetic core portion positionable in alinement with any one of the lower magnetic core portions, means for moving said upper head portion relative to said lower head portion, and a read-write coil on said upper core portion, each of the lower core portions having a narrow gap therein, the adjacent faces of alined lower and upper core portions being spaced and formed to constitute a narrower gap with larger facial areas than the gaps in the lower core portions.

4. In a magnetic memory device, a read-write head comprising a lower fixed head portion comprising a plurality of magnetic core portions disposed in operative relation to a recording medium, an upper head portion movable with respect to the lower core portions and comprising a complementary core portion selectively positionable in alinement with any one of the lower core portions, each of the lower core portions having a narrow gap therein, the adjacent faces of alined lower and upper core portions being spaced and formed to constitute a narrower gap with larger facial areas than the gaps in the lower core portions, and means for effecting said alignment of the respective upper and lower core portions.

5. In a read-write head for a magnetic memory device, a magnetic core comprising fixed and movable portions, said fixed portion comprising core segments spaced apart to form a reluctance gap in fixed relation to a recording medium, said movable portion comprising a core segment shaped to complement the segments of said fixed portion and when moved into complementary relation to said first mentioned core segments completing a magnetic circuit, and coil means wound on said movable portion.

6. In a read-write head for a magnetic memory device, a magnetic core comprising a fixed and a movable portion, said fixed portion comprising core segments spaced to form a reluctance gap in fixed relation to a recording medium, said movable portion comprising a core segment shaped to complement the segments of said fixed portion and when moved into complementary relation to said first mentioned segments completing a magnetic circuit, the contiguous areas of said fixed and movable portions when in complementing relation defining a core gap of greater cross sectional area than said reluctance gap, and a coil wound on said movable portion.

7. In a read-write head for a magnetic memory device magnetic core means comprising a plurality of fixed core portions and a movable core portion, each fixed core portion comprising core segments spaced to form a reluctance gap in fixed relation to a predetermined area of a recording medium, said movable portion comprising a core segment movable into complementary relation to a selected one of said fixed core portions, said movable portion when complementing a fixed portion completing a magnetic circuit including said gap, and coil means wound on said movable portion.

8. In a read-write head for a magnetic memory device, magnetic core means comprising a plurality of fixed core portions and a movable core portion, each fixed portion comprising core segments spaced to form a reluctance gap in fixed relation to a predetermined area of a recording medium, said movable portion comprising a core segment shaped to complement the segments of a fixed core portion, said movable portion when moved into complementary relation to a selected one of said fixed portions completing a magnetic circuit including the reluctance gap formed by the segments of the selected one of said fixed portions, the areas of the respective fixed and movable portions disposed for contiguity with each other being formed to define a gap of greater cross sectional area than said reluctance gap, and a coil wound on said movable portion.

References Cited in the file of this patent

UNITED STATES PATENTS

| | | |
|---|---|---|
| 2,068,116 | Shotter | Jan. 19, 1937 |
| 2,733,425 | Williams et al. | Jan. 31, 1956 |

Notice of Adverse Decision in Interference

In Interference No. 89,560 involving Patent No. 2,831,180, B. Hasbrouck, Traveling magnetic half-heads for magnetic drums, final judgment adverse to the patentee was rendered May 2, 1962, as to claims 1, 2, 5, and 7.

[*Official Gazette June 12, 1962.*]